US008830787B2

(12) United States Patent
Dorovsky et al.

(10) Patent No.: US 8,830,787 B2
(45) Date of Patent: Sep. 9, 2014

(54) RESONANCE METHOD FOR MEASURING THE ELECTROACOUSTIC CONSTANT AND PERMEABILITY OF ROCK FORMATIONS

(75) Inventors: Vitaly N. Dorovsky, Novosibirsk (RU); Alexander I. Fedorov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 399 days.

(21) Appl. No.: 13/222,579

(22) Filed: Aug. 31, 2011

(65) Prior Publication Data
US 2012/0224455 A1  Sep. 6, 2012

Related U.S. Application Data

(60) Provisional application No. 61/379,500, filed on Sep. 2, 2010.

(51) Int. Cl.
  *G01V 11/00* (2006.01)
  *G01V 1/40* (2006.01)
  *G01V 1/50* (2006.01)
(52) U.S. Cl.
  CPC ......... *G01V 11/00* (2013.01); *G01V 1/50* (2013.01); *G01V 2210/6163* (2013.01)
  USPC .............................. 367/35; 367/25; 324/366
(58) Field of Classification Search
  USPC .................. 367/25, 35; 324/366, 367
  See application file for complete search history.

(56) References Cited

U.S. PATENT DOCUMENTS

| | | | |
|---|---|---|---|
| 4,904,942 A | | 2/1990 | Thompson |
| 4,987,969 A | * | 1/1991 | Boyle et al. ............... 181/102 |
| 5,841,280 A | | 11/1998 | Yu et al. |
| 6,415,648 B1 | * | 7/2002 | Peeters ........................ 73/38 |
| 7,048,089 B2 | * | 5/2006 | West et al. ................ 181/105 |
| 7,813,219 B2 | | 10/2010 | Dubinsky et al. |
| 2008/0306692 A1 | * | 12/2008 | Singer et al. .............. 702/11 |
| 2009/0180350 A1 | | 7/2009 | Dorovsky |

OTHER PUBLICATIONS

Mikhailov et al., "Using borehole electroseismic measurements to detect and characterize fractured (permeable) zones," Geophysics, vol. 65, No. 4 (Jul. 2000), pp. 1098-1112.*
Notification of Transmittal of the International Search Report and the Written Opinion of the International Searching Authority, or the Declaration; PCT/US2011/050327, Mar. 28, 2012.

* cited by examiner

Primary Examiner — Ian J Lobo
(74) Attorney, Agent, or Firm — Cantor Colburn LLP

(57) ABSTRACT

Disclosed is a method for estimating a property of an earth formation penetrated by a borehole. The method includes: transmitting acoustic waves into the formation from an acoustic source disposed in the borehole and away from a wall of the borehole; generating radial acoustic eigenwaves within a space between the wall of the borehole and the acoustic source using the transmitted acoustic waves; receiving an acoustic signal with an acoustic receiver disposed at the wall of the borehole; sensing an electric field signal with an electric field sensor disposed at the wall of the borehole; and estimating the property using the received acoustic signal and the sensed electric field signal.

14 Claims, 7 Drawing Sheets

RESONANCE METHOD FOR MEASURING THE ELECTROACOUSTIC CONSTANT AND PERMEABILITY OF ROCK FORMATIONS

CROSS REFERENCE TO RELATED APPLICATIONS

This application claims the benefit of an earlier filing date from U.S. Provisional Application Ser. No. 61/379,500 filed Sep. 2, 2010, the entire disclosure of which is incorporated herein by reference.

BACKGROUND

1. Field of the Invention

The invention disclosed herein relates to measuring a property of an earth formation from a borehole penetrating the earth formation.

2. Description of the Related Art

There is much interest in geologic or rock formations for a variety of reasons such as hydrocarbon production, geothermal production and carbon dioxide sequestration. Boreholes are typically drilled into formations in order to access the formations for performing measurements. The measurements are then used to investigate properties of the formations.

One property of interest is permeability. The permeability of a formation relates to the ability of the formation to transport or flow a fluid within its pores. Permeable formations tend to have many large well-connected pores through which a fluid can readily flow. It is apparent that by knowing the permeability of a formation of interest, drilling decisions can be made to efficiently use drilling resources. It would be well received in the drilling industry if permeability could be accurately and efficiently determined.

BRIEF SUMMARY

Disclosed is a method for estimating a property of an earth formation penetrated by a borehole. The method includes: transmitting acoustic waves into the formation from an acoustic source disposed in the borehole and away from a wall of the borehole; generating radial acoustic eigenwaves within a space between the wall of the borehole and the acoustic source using the transmitted acoustic waves; receiving an acoustic signal with an acoustic receiver disposed at the wall of the borehole; sensing an electric field signal with an electric field sensor disposed at the wall of the borehole; and estimating the property using the received acoustic signal and the sensed electric field signal.

Also disclosed is an apparatus for estimating a property of an earth formation penetrated by a borehole. The apparatus includes: a carrier configured to be conveyed through the borehole; an acoustic source disposed at the carrier and away from a wall of the borehole, the acoustic source configured to transmit acoustic waves into the formation to generate radial acoustic eigenwaves within a space between the wall of the borehole and the acoustic source; an acoustic receiver disposed at the carrier and configured to be located at the wall of the borehole and to receive an acoustic signal; an electric field sensor disposed at the carrier and configured to be located at the wall of the borehole and to sense an electric field signal; and a processor coupled to the acoustic receiver and the electric field sensor and configured to estimate the property using a received acoustic signal and a sensed electric field signal.

Further disclosed is a non-transitory computer readable medium having computer executable instructions for estimating a property of an earth formation penetrated by a borehole by implementing a method. The method includes: receiving an acoustic signal with an acoustic receiver disposed in the borehole at a wall of the borehole, the acoustic signal being related to acoustic eigenwaves generated within a space between the wall of the borehole and an acoustic source transmitting acoustic waves into the earth formation; sensing an electric field signal with an electric field sensor disposed in the borehole at the wall of the borehole; and estimating the property using the received acoustic signal and the sensed electric field signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
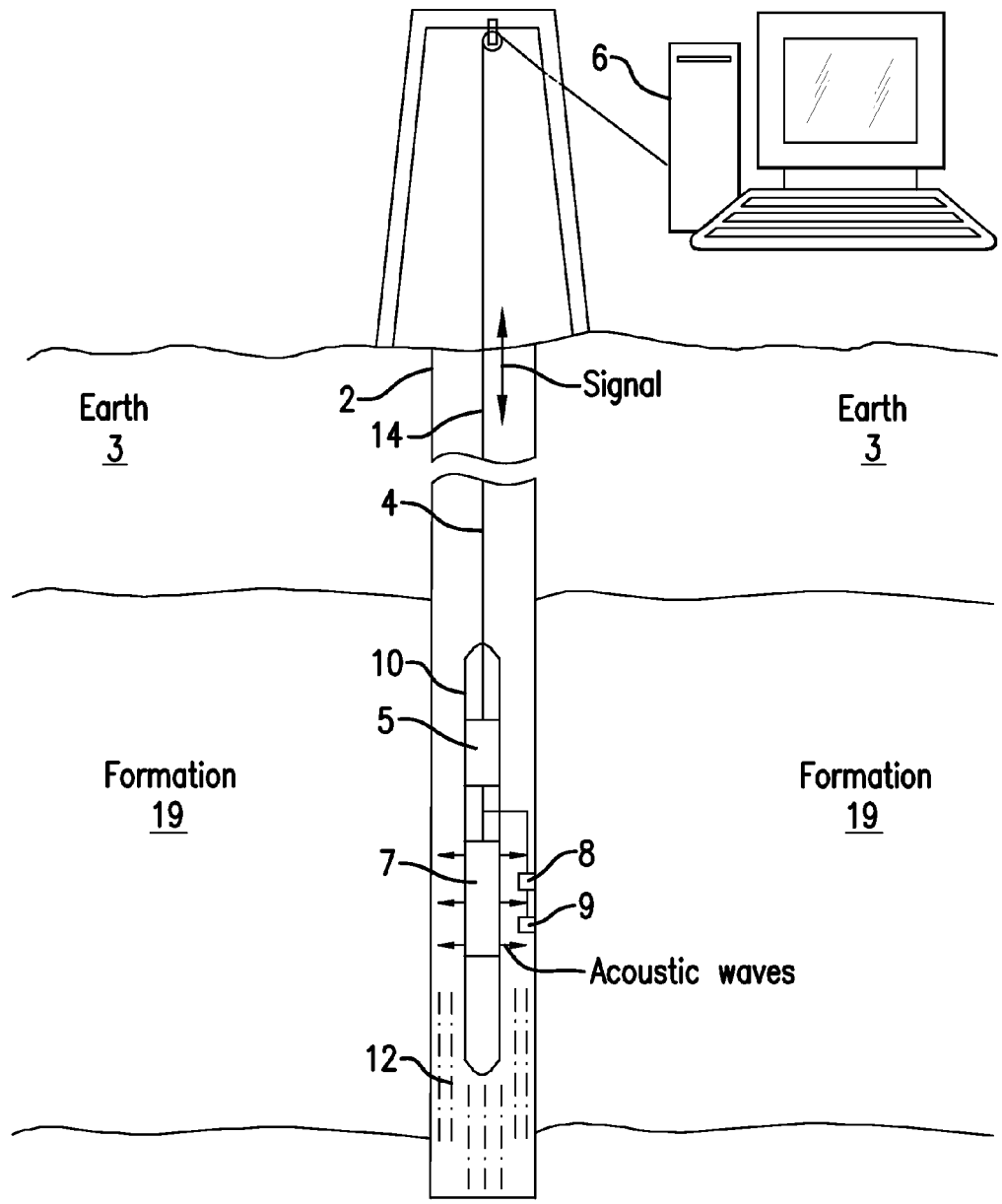
FIG. 1 illustrates an exemplary embodiment of a downhole tool disposed in a borehole penetrating the earth.

FIG. 1 illustrates an exemplary embodiment of a downhole tool 10 disposed in a borehole 2 penetrating the earth 3, which includes a geologic formation 19. The formation 19 represents any subsurface materials of interest. The borehole 2 is filled with a borehole fluid 12, such as drilling mud. The downhole tool 10 is configured to perform measurements that are used to estimate properties of the formation 19. In order to operate the downhole tool 10 and/or provide a communications interface with the surface computer processing system 6, the downhole tool 10 includes downhole electronics 5.

The downhole tool 10 is conveyed through the borehole 2 by a carrier 4. In the embodiment of FIG. 1, the carrier 4 is an armored wireline 14. Besides supporting the downhole tool 10 in the borehole 2, the wireline 14 can also provide communications between the downhole tool and the computer processing system 6 disposed at the surface of the earth 3. In logging-while-drilling (LWD) or measurement-while-drilling (MWD) embodiments, the carrier 4 can be a drill string. In LWD/MWD operations, measurements can be performed while drilling or during a temporary halt in drilling. Measurements performed during LWD/MWD can be transmitted to the computer processing system 6 using downhole telemetry such as pulsed mud or wired drill pipe.

Still referring to FIG. 1, the downhole tool 10 includes an acoustic source 7 configured to emit acoustic energy such as acoustic waves having amplitude and frequency. The downhole tool 10 also includes an acoustic receiver 8 and an electric field sensor 9. The acoustic receiver 8 is configured to receive and measure acoustic waves. The electric field sensor 9 is configured to measure an electric field present at the electric field sensor 9. Both the acoustic receiver 8 and the electric field sensor 9 are configured to be placed at a wall of the borehole 2 or near the wall relative to the acoustic source 7.

Figure 2:
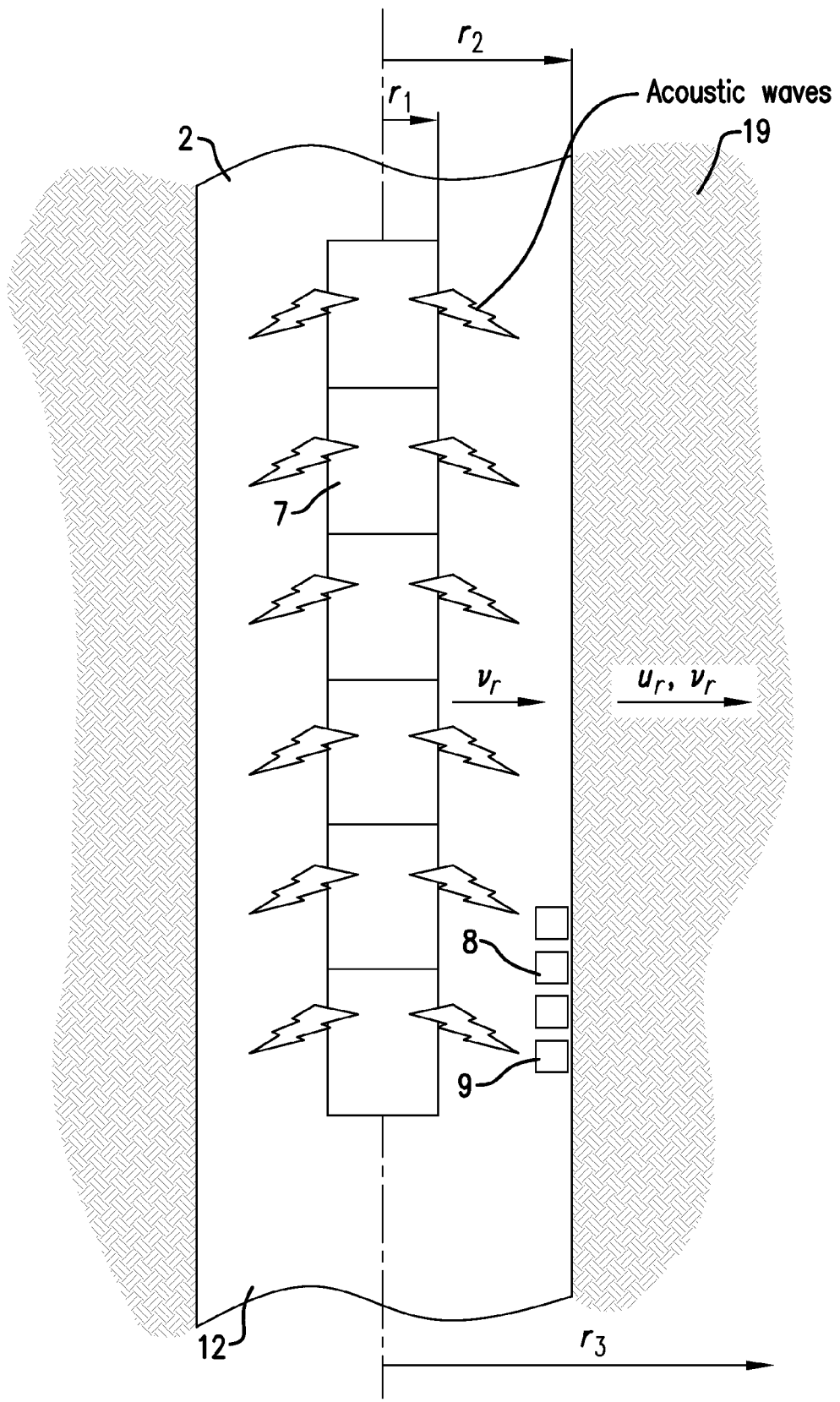
FIG. 2 depicts aspects of performing measurements downhole using the downhole tool.

The techniques disclosed herein provide for measuring permeability and the electroacoustic constant of the formation 19 saturated with a fluid (i.e., formation fluid). To perform the measurements, the techniques call for using resonance amplification of sensitivity of radial acoustic oscillations in a space in the borehole 2, which is surrounded by a porous permeable medium represented by the formation 19. The acoustic receiver 8 and the electric field sensor 9 are placed into the borehole fluid 12 next to the interface of the porous permeable medium and the borehole 2 (i.e. wall of the borehole 2) as shown in FIG. 2. In FIG. 2, $u_r$ is the radial velocity of the formation matrix and $v_r$ is the radial velocity of the fluid contained in the formation matrix.

Overall, the techniques disclose writing detailed mathematical equations using the laws of physics to describe acoustic resonance at the eigenfrequencies. Hence, an acoustic wave at an eigenfrequency is referred to as an "eigenwave." Boundary conditions are applied to the equations and the resulting set of equations is solved using acoustic measurements obtained from the acoustic receiver 8 and electrodynamic measurements obtained from the electric field sensor 9. In general, the set of equations with the measurement inputs is solved using math solver programming in a computer. By solving the set of equations with the measurement inputs, an electroacoustic constant ($\alpha$) and a friction coefficient are determined. The permeability of the formation 19 can be determined once the electroacoustic constant and the friction coefficient are known.

The term "electroacoustic constant" relates to the value of an electric field generated by fluid flow through a porous medium (with either constant flow or oscillating flow). The electroacoustic constant is determined experimentally. The importance of the electroacoustic constant for determining permeability is to obtain an exact value of permeability because the electroacoustic constant influences the friction coefficient and, thus, must be accounted for. The term "friction coefficient" is a coefficient that relates motion of a fluid in a matrix to the motion of the matrix or relates the motion of the matrix to the motion of the fluid. If the friction coefficient is small, then the fluid tends not follow the motion of the matrix. The friction coefficient is $\chi$ if the electroacoustic constant is zero and is $\chi^*$ if the electroacoustic constant is not zero.

Figure 3:
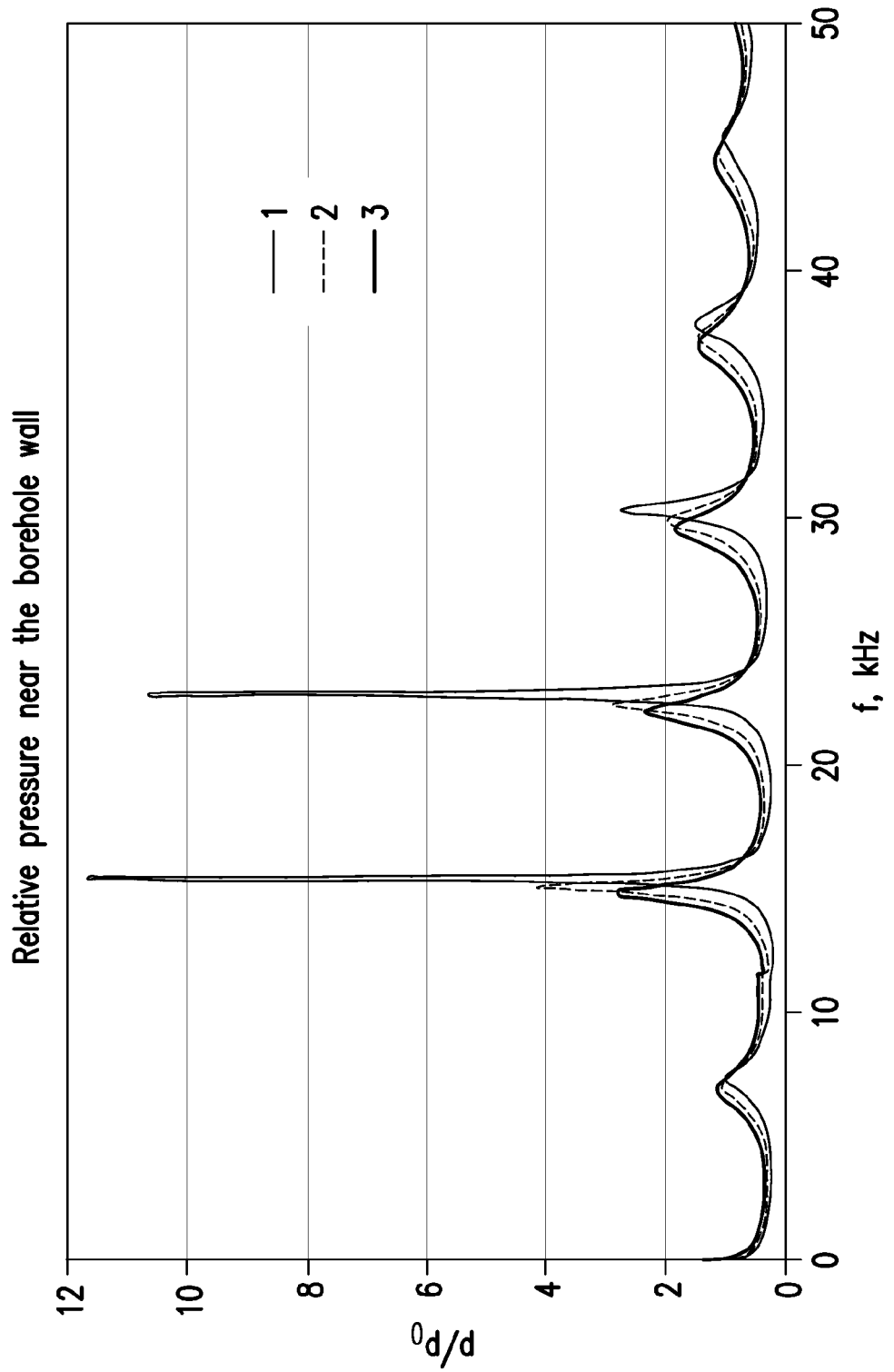
FIG. 3 depicts aspects of frequency dependence of the relative pressure near a wall of the borehole for three values of the friction coefficient.

As theoretical research discussed below shows, acoustic oscillation modes of the space in the borehole 2 have their resonance eigenfrequencies. FIG. 3 demonstrates aspects of frequency dependence for behavior of pressure disturbances of dimensionless amplitude inside the borehole 2 close to the surface of the porous medium for three values of the friction coefficient ($\chi^* \rho_f$) of the porous medium beyond the borehole 2. The pressure disturbances are presented as $p/p_0$ where p is the pressure measured by the acoustic receiver 8 and $p_0$ is the pressure at an emitting surface of the acoustic source 7. The three values of ($\chi^* \rho_f$) are $2.4 \times 10^7$/second for curve 1, $2.1 \times 10^7$/second for curve 2, and $0.8 \times 10^7$/second for curve 3.

FIG. 3 illustrates frequency dependence of oscillation velocity of the solid matrix of the porous medium and of the fluid saturating the porous medium at the interface of the two media. The dependence of the oscillation velocity is presented as $(u-v)/c_t$ for three values of the friction coefficient where u is the velocity of the matrix, v is the velocity of the saturating fluid, and $c_t$ is the shear or transversal wave velocity. The same three values of the friction coefficient that were presented in FIG. 3 are used for the three curves in FIG. 4.

Figure 4:
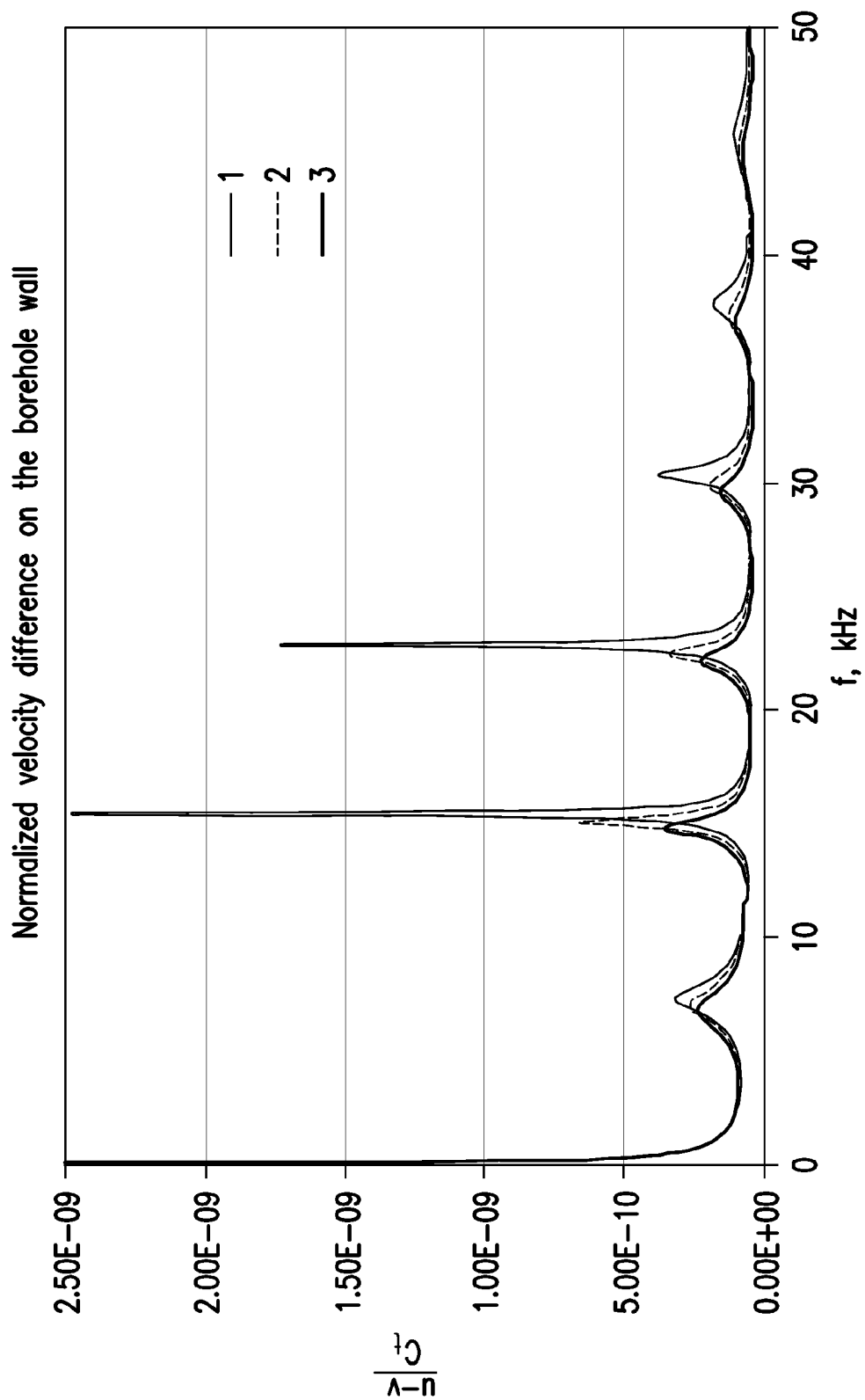
FIG. 4 depicts aspects of frequency dependence of normalized velocity difference at the wall of the borehole for the three values of the friction coefficient.
Figure 5:
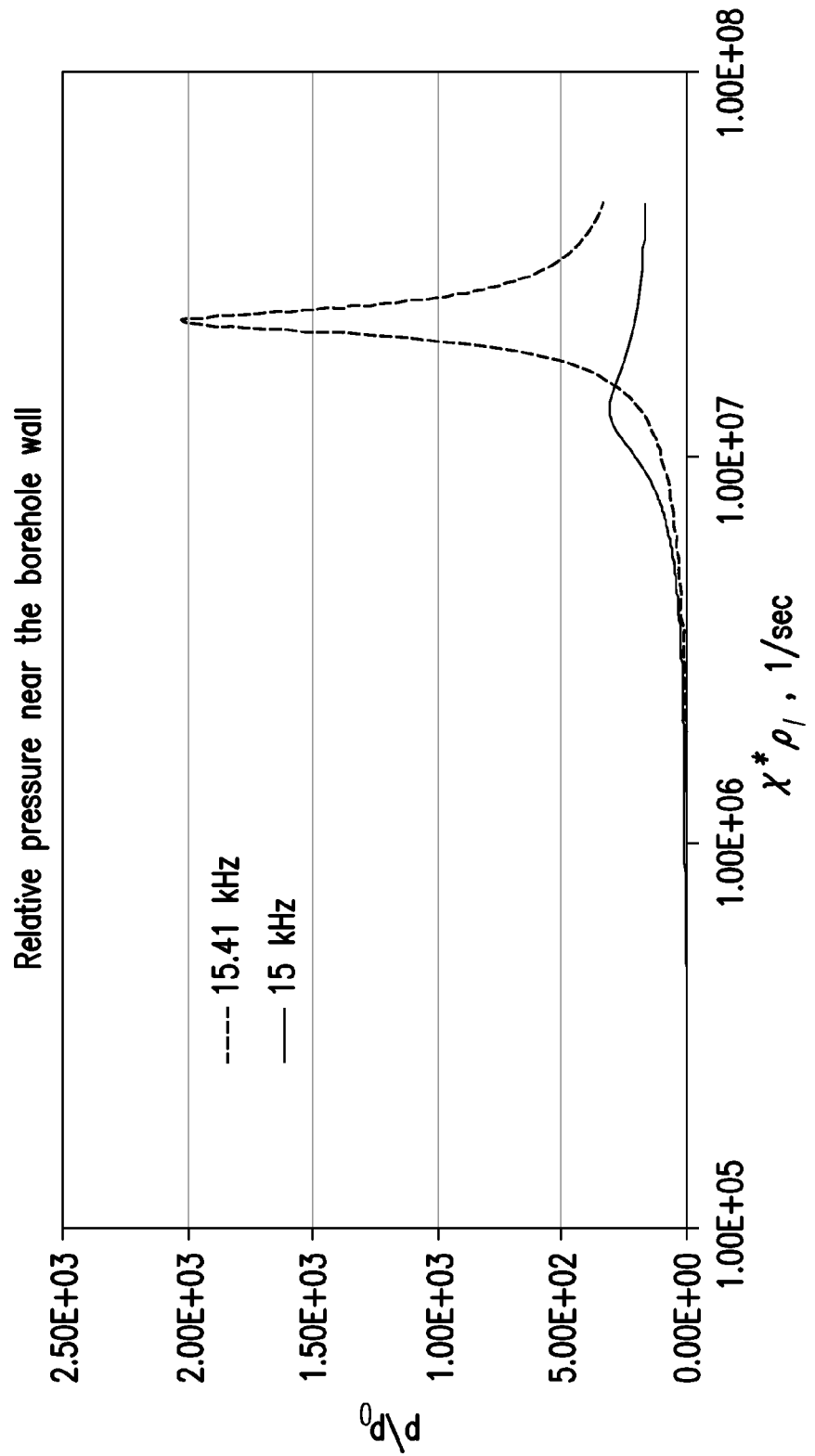
FIG. 5 depicts aspects of dependence of relative pressure near a wall of the borehole on the friction coefficient at a resonance frequency and at a frequency close to resonance.
Figure 6:
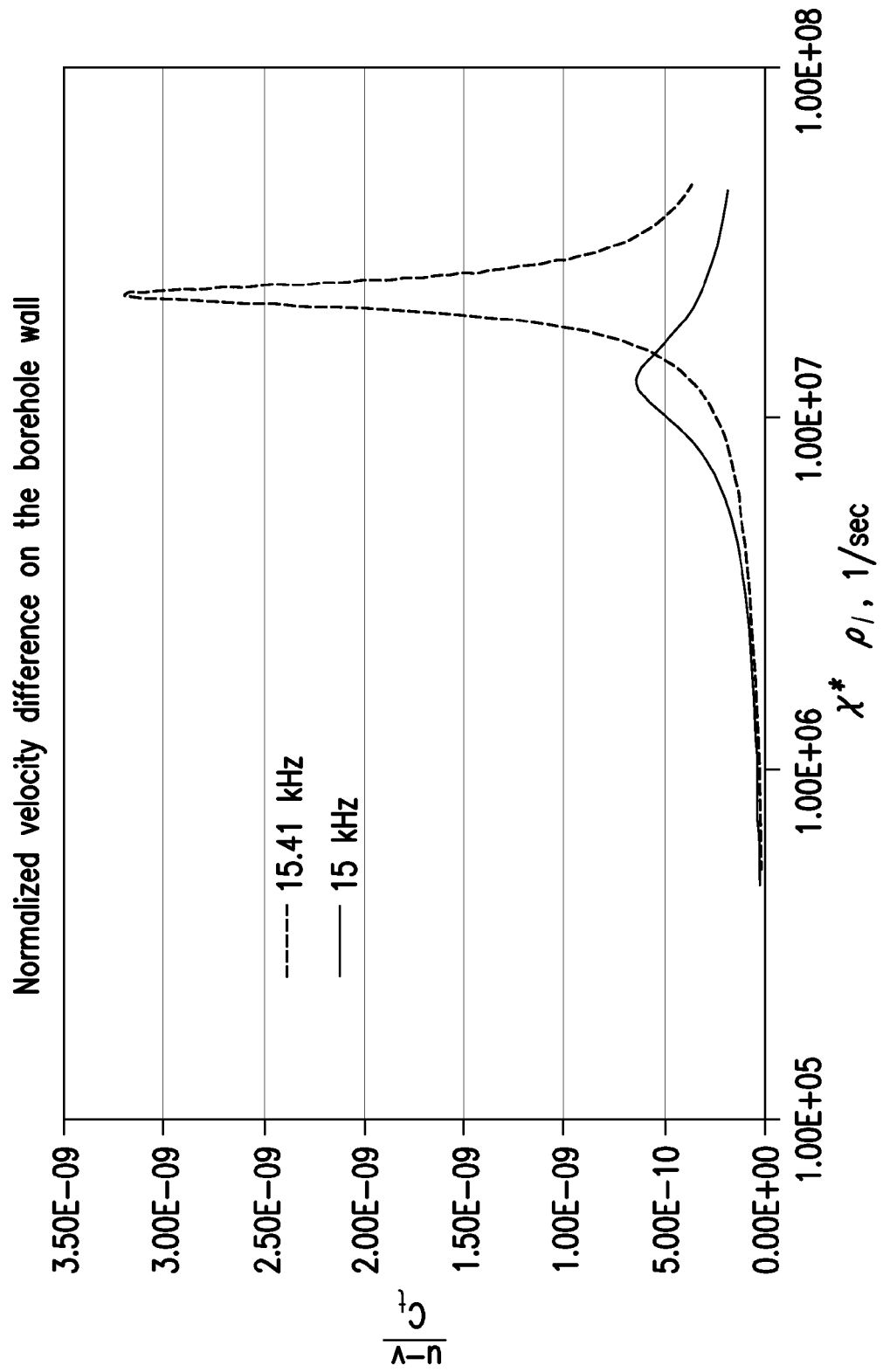
FIG. 6 depicts aspects of dependence of the normalized velocity difference at the wall of the borehole on the friction coefficient at a resonance frequency and at a frequency close to resonance.

Referring to FIGS. 3 and 4, close to the resonance frequency (~15.41 kHz) for the eigenwaves of the borehole 2, fluctuations of the pressure and the velocity difference experience resonance sensitivity of the observed amplitude oscillations to the effective friction coefficient. The pressure ratio at the resonance frequency is known from measurements as is the electric field, which is proportional to the velocity difference. In addition, a graph of the theoretical dependence of the pressure ratio on the effective friction coefficient and the electroacoustic constant is available as shown in FIG. 5. FIG. 5 presents the relative pressure near the wall of the borehole 2 at a frequency at resonance and at a frequency close to resonance. For the velocity difference dependence on the friction coefficient, the graph presented in FIG. 6 is available at a frequency at resonance and a frequency near resonance. The techniques predict a relationship between the electric field and the electroacoustic constant, as well as between the electric field and the friction coefficient. Using the measurement data obtained using the acoustic source 7, the acoustic receiver 8, and the electric field sensor 9, the effective friction coefficient and the electroacoustic constant can be found. Permeability (k) can be found from $\chi \rho_f = \eta/(\rho_0 k)$ where $\eta$ is the formation fluid viscosity. In general, the formation fluid viscosity may already be known or determined from formation sampling and testing.

One example of a procedure for measuring permeability may be reduced to a sequence of the following steps. The acoustic source 7 of radial acoustic waves (the excitation of the system) is placed in the center of the borehole 2. The acoustic receiver 8 of the radial acoustic waves (recording the system's response) is placed next to the interface of the porous medium and the borehole 2. The electric field sensor 9 for measuring the electric field at the interface between the two media is also placed at the interface. Based on the character of the system's response to the acoustic excitation of the system, the lowest resonance frequency is obtained.

Because porosity, sound velocities in the system, fluid viscosity, and the geometrical size are known a priori, the effective friction coefficient of the porous medium can be found from theoretical dependence of amplitude of pressure disturbances (see FIG. 3) for the fluid close to the interface (or close to interface deformations) at the resonance frequency. Because the theoretical dependence of the amplitude of the electric field (based on computational formula) on the electroacoustic constant and that of velocity difference as a function of the effective friction coefficient, the friction coefficient and the electroacoustic constant can be obtained from using joint curves. Permeability (k) can be found from $\chi \rho_f = \eta/(\rho_0 k)$. The shift of the system's acoustic sensitivity area (i.e., some part of the dependence—area in the space of permeability) is achieved by changing the viscosity of the borehole fluid, which can be achieved by changing the borehole fluid 12 (this can be performed locally).

The theory describing radial oscillations for measuring permeability in a saturated porous medium is based on a linearized version of the non-linear filtration theory. Such a theory assumes the following conservation laws as the initial set of differential equations:

$$\frac{\partial \rho}{\partial t} + \mathrm{div}\, j = 0, \quad j = \rho_s u + \rho_l v,$$

entropy, energy, and momentum conservation laws:

$$\frac{\partial S}{\partial t} + \mathrm{div}\left(\frac{S}{\rho}j\right) = \frac{R}{T}, \quad \frac{\partial E}{\partial t} + \mathrm{div}\, Q = 0$$

$$\frac{\partial}{\partial t}\left(j + \frac{E \wedge H}{4\pi c_e}\right)_i + \partial_k \prod_{ik} = 0;$$

first principle of thermodynamics:

$$dE_0 = TdS + \mu d\rho + (u-v, dj_0) + \frac{h_{ik}}{2} dg_{ik},$$

where $h_{ik}$ is a stress tensor;
equation describing the evolution of the metric tensor of deformations of the matrix $g_{ik}$:

$$\frac{\partial g_{ik}}{\partial t} + g_{ik}\partial_i u_j + g_{ij}\partial_k u_j + u_j \partial_j g_{ik} = 0;$$

motion equation for the electrolyte (i.e., formation fluid is a liquid) in the porous matrix:

$$\frac{\partial v}{\partial t} + (v, \nabla) v = -\nabla \mu - \frac{S}{\rho}\nabla T + f + f^\partial.$$

Full energy can be expressed as follows:

$$E = E_0 + v j_0 + \frac{\rho v^2}{2} + \frac{E^2 + H^2}{8\pi}.$$

In the equations presented above, the following notations are used: bold type represents a vector quantity, Q is energy flow, $\rho$, $\rho_l$, $\rho_s$ are density of the porous saturated medium, partial density of the electrolyte in pores, partial density of the matrix; S, E, $E_0$ are entropy, energy, and internal energy per unit of volume of the medium; u, v are velocities of the matrix and of the electrolyte contained in it; E, H are the electric and magnetic field intensities; $\mu$, T are the chemical potential and temperature from the first principle of thermodynamics; $j_0 = \rho_s (u-v)$ is the invariant component of the momentum.

The full energy expression above is obtained from the energy equation used in the hydrodynamic theory, extended to a two-velocity continuous medium. The electromagnetic theory is included up to a square-law accuracy for v/c. The motion equation for the liquid component contains the motion force on the right-hand side. This motion force is linear with respect to gradients of thermodynamic variables whose equilibrium values are constant within the scale of the system. The physical essence of this theory is determined by dependence of flows from thermodynamic variables and can be uniquely defined by the following physical principles of general nature: invariance of these equations in regard to Galileo transformation, Minkovsky transformation for electromagnetic fields, conservation laws, and the second principle of thermodynamics for non-equilibrium systems. Based on these principles, dependences of flows and forces upon thermodynamic degrees of freedom can be determined as follows:

for the stress tensor (generalization of Murnagan formulae to deformed porous formations)

$$h_{ik} = (-\rho)^2 \frac{\partial (E_0/\rho)}{\partial \rho} \delta_{ik} - 2\rho g_{im}\frac{\partial (E_0/\rho)}{\partial g_{mk}};$$

for the density tensor of the momentum flow $$\prod_{ik} = \rho_s u_i u_k + \rho_l v_i v_k + p\delta_{ik} + h_{ij} g_{jk} - \frac{B_i B_k}{4\pi} - \frac{E_i E_k}{4\pi} + \frac{E^2 + H^2}{8\pi}\delta_{ik},$$

where B is the magnetic field.
Pressure is determined by this thermodynamic equation:

$$p = -E_0 + TS + \mu\rho + (u-v, j_0);$$

for energy flow where c is the electrodynamic constant (velocity of light) and $h_{km}g_{mi}$ represents $$\sum_m h_{km} g_{mi}$$

$$Q = \left(\mu + \frac{v^2}{2}\right)j + \frac{TS}{\rho}j + u(u, j_0) + \frac{c}{4\pi}(E \wedge B) + u_i h_{km} g_{mi};$$

for the dissipative function where c is the electrodynamic constant (velocity of light)

$$R = f^\partial(\rho u - j) + i_0\left(E + \frac{j^e}{c\chi} \wedge B\right).$$

The operator "$\wedge$" is the cross product of two vectors.
Volumetric density of reversible forces $$f = \frac{\chi_l}{\rho_l}\left(E + \frac{j^e}{c\chi} \wedge B\right)$$

includes volumetric densities of free charges $\chi_s$, $\chi_l$, $\chi = \chi_s + \chi_l$ which correspond to subsystems for which the following equations work: $\chi_s = \sigma_s \sigma^{-1}\chi$, $\chi_l = \sigma_l \sigma^{-1}\chi$. Here $\sigma_l$, $\sigma_s$, $\sigma = \sigma_s + \sigma_l$ are densities associated with matching subsystems.

The dissipative function allows linking the dissipative force $f^\partial$ and the invariant component of the full current density $j^e$ $$i_0 = j^e - \chi_s u - \chi_l v$$

to thermodynamic forces by means of introducing kinetic phenomenological coefficients $\chi$, $\alpha$, $\sigma$ $$f^\partial = \chi(\rho u - j) + \alpha_{12}\left(E + \frac{j^e}{c^e \chi} \wedge B\right),$$

-continued $$i_0 = \alpha_{21}(\rho u - j) + \sigma\left(E + \frac{j^e}{c^e \chi} \wedge B\right), \alpha_{12}(B) = \alpha_{21}(-B) = \alpha.$$

These equations are closed by a set of electrodynamic equations (with no polarization effect considered)

$$rotE = -\frac{1}{c}\frac{\partial B}{\partial t}, rotB = \frac{1}{c}\frac{\partial E}{\partial t} + \frac{4\pi}{c}j^e, divE = 4\pi\chi, divB = 0.$$

The operator "rot" is the curl vector operator.

These equations do not consider effects related to transfers of contaminating compounds concentrations. Also, kinetic effects of scalar and tensor nature are not included. In irreversible vector flows thermoconductivity effects are neglected. The state equation can be obtained both arbitrarily and in Hook approximation by means of expansion of internal energy according to thermodynamic degrees of freedom up to cubic terms of the series [1].

These equations describe electrolyte filtration in a porous matrix undergoing arbitrary elastic deformations. These equations describe the entire range of acoustic, electroacoustic, and magnetoacoustic waves allowed in the system.

In linear approximation for velocities of deformation and fluid motion and in quasistationary approximation of the electromagnetic field, the set of equations can be reduced to a set of three equations, with linear accuracy:

$$u - c_t^2 \Delta u - a_1 \nabla divu + a_2 \nabla divv + \frac{\rho_{0,l}^2}{\rho_{0,s}}\chi^*(\dot{u} - \dot{v}) + \frac{\alpha c \rho_{0,l}}{4\pi\sigma\rho_{0,s}}rot\dot{B} = 0,$$

$$v - a_4 \nabla divv + a_3 \nabla divu - \rho_{0,l}\chi^*(\dot{u} - \dot{v}) - \frac{\alpha c}{4\pi\sigma}rot\dot{B} = 0,$$

$$\frac{\partial B}{\partial t} = rot\left[-\frac{c^2}{4\pi\sigma}rotB + \frac{\alpha c \rho_l}{\sigma}(u - v)\right].$$

In the above set of three equations, $\rho_{0,l} = \rho_l$ and $\rho_{0,s} = \rho_s$.

The acoustic field in fluid is described by linear equations which determine the velocity of hydrodynamic oscillations in fluid:

$$\ddot{v} - c_{p0}^2 \nabla div\, v = 0.$$

The acoustic field in the porous medium (with $B_0=0$.):

$$\ddot{u} - c_t^2 \Delta u - a_1 \nabla divu + a_2 \nabla divv + \frac{\rho_{0,l}^2}{\rho_{0,s}}\chi^*(\dot{u} - \dot{v}) = 0,$$

$$\ddot{v} - a_4 \nabla divv + a_3 \nabla divu - \rho_{0,l}\chi^*(\dot{u} - \dot{v}) = 0,$$

$$\frac{\partial B}{\partial t} = rot\left[-\frac{c^2}{4\pi\sigma}rotB + \frac{\alpha c \rho_l}{\sigma}(u - v)\right].$$

The electric field radial component ($E_r$) in fluid is described by equation $$E_r = \frac{\alpha \rho_s}{\sigma}(u_r - v_r),$$

where $$\chi^* = \chi - \frac{\alpha^2}{\sigma}, \rho_l, \rho_s$$

are partial densities of fluid and solid, respectively; $\rho_0 = \rho_l + \rho_s$, $\alpha_j$ are values determined by three elastic moduli $\lambda$, $\mu$, $\alpha_3$ as follows:

$$a_1 = \rho_s\rho_0\alpha_3 + \frac{\rho_l^2}{\rho_0^2}\frac{K}{\rho_s} + \frac{1}{3}\frac{\mu}{\rho_s}, a_2 = \frac{\rho_l}{\rho_s}\left(\frac{\rho_l}{\rho_0^2}K - \rho_s\rho_0\alpha_3\right),$$

$$a_3 = \frac{\rho_l}{\rho_0^2}K - \rho_s\rho_0\alpha_3, a_4 = \frac{\rho_l}{\rho_0^2}K + \rho_l\rho_0\alpha_3, K = \lambda + \frac{2}{3}\mu.$$

These three elastic moduli are obtained from the equations given below through acoustic velocities measured at a high frequency:

$$\mu = \rho_s c_t^2,$$

$$K = \frac{1}{2}\frac{\rho_s}{\rho_l}\left(\rho_0 c_{p1}^2 + \rho_0 c_{p2}^2 - \frac{8}{3}\rho_l c_t^2 - \sqrt{(\rho_0 c_{p1}^2 - \rho_0 c_{p2}^2)^2 - \frac{64}{9}\rho_s\rho_l c_t^4}\right),$$

$$\alpha_3 = \frac{1}{2\rho_0^3}\left(\rho_0 c_{p1}^2 + \rho_0 c_{p2}^2 - \frac{8}{3}\rho_s c_t^2 + \sqrt{(\rho_0 c_{p1}^2 - \rho_0 c_{p2}^2)^2 - \frac{64}{9}\rho_s\rho_l c_t^4}\right).$$

Below, where the boundary conditions for the equations above are given, the bracketed index refers to values related to the borehole fluid (0) and the porous medium (1):

1) at the surface of the source which excites oscillations in the fluid ($r=r_1$):

$p^{(0)} = P_0.$ 2) at the interface of the borehole 2 and the porous medium ($r=r_2$):

$$(1 - \Phi)u_r^{(1)} + \Phi v_r^{(1)} = v_r^{(0)},$$

$$\frac{p^{(1)}}{\rho_0^{(1)}} - \rho_l\chi(\varphi_u^{(1)} - \varphi_v^{(1)}) = \frac{p^{(0)}}{\rho_0^{(0)}},$$

$$\Sigma_{rr}^{(1)} = \Sigma_{rr}^{(0)},$$

$$\Sigma_{zr}^{(1)} = 0.$$

where $\phi_{u,v}$ are potentials which determine the velocity of radial oscillations of the medium and $\Phi$ is porosity:

$u = \nabla \phi_u, v = \nabla \phi_v.$

Components of stress tensors and pressures are determined through displacement velocities in the general form, as follows:

$$\Sigma_{zr}^{(1)} = -\mu\left(\frac{\partial u_z}{\partial r} + \frac{\partial u_r}{\partial z}\right) = -\mu(u_z' + iku_r),$$

$$\Sigma_{rr}^{(1)} = -p^{(1)} - h_{rr}^{(1)} =$$

$$\left(\alpha_3\rho_0^2\rho_s - \frac{2}{3}\mu\right)divu + \alpha_3\rho_0^2\rho_l divv + 2\mu u_r' \equiv \mu_1 divu + \mu_2 divv + 2\mu u_r'.$$

$$\Sigma_{rr}^{(0)} = -p^{(0)} = \rho_0^{(0)} c_{p0}^2 divv^{(0)} \equiv \lambda_0 divv^{(0)},$$

-continued $$-\dot{p}^{(1)} = \left(\alpha_3\rho_0^2\rho_s - \frac{\rho_l}{\rho_0}K\right)div u^{(1)} + \left(\alpha_3\rho_0^2\rho_l + \frac{\rho_l}{\rho_0}K\right)div v^{(1)} \equiv \pi_1 div u^{(1)} + \pi_2 div v^{(1)}.$$

From the equations given above, one can see that the acoustic part of this theory enables us to find the effective friction coefficient $\chi^*$ from acoustic measurements. At the same time, the velocity difference u–v can be found as a function of the effective friction coefficient. In other words, acoustics enables us to measure both $\chi^*$ and $(u-v)(\chi^*)$. Electrodynamic measurements enable measurement of $$E_r = \frac{\alpha\rho_s}{\sigma}(u_r - v_r).$$

These two measurements enable us to restore the theoretical values of $\alpha$ and $\chi$. Permeability (k) can be found from $\chi\rho_f=\eta/(\rho_0 k)$ where other terms in this expression are derived from the acoustic and electrodynamic measurements.

Figure 7:
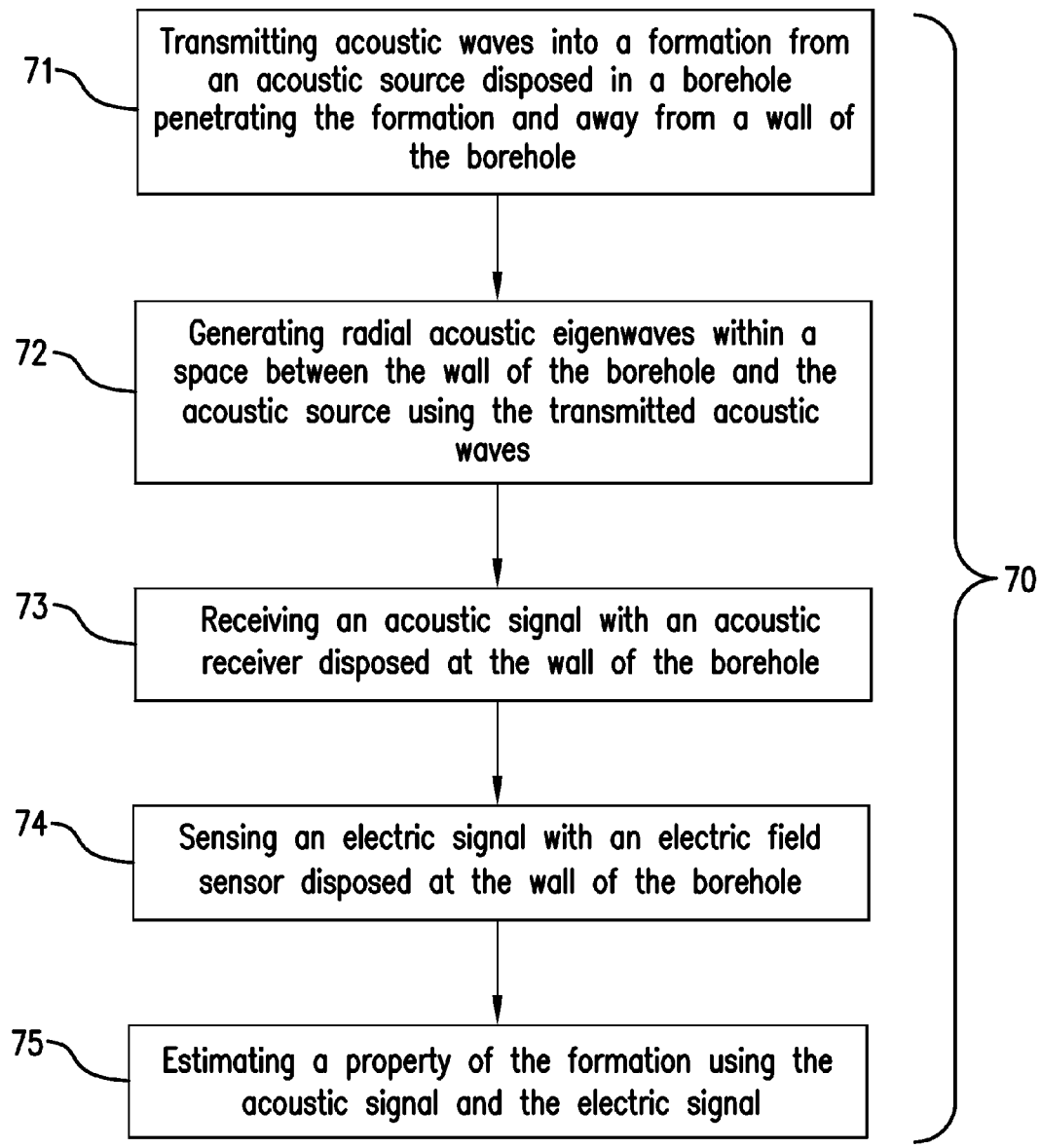
FIG. 7 presents one example of a method for estimating a property of an earth formation penetrated by a borehole.

FIG. 7 presents one example of estimating a property of an earth formation penetrated by a borehole. The method 70 calls for (step 71) transmitting acoustic waves into the formation from an acoustic source disposed in the borehole and away from a wall of the borehole. Further, the method 70 calls for (step 72) generating radial acoustic eigenwaves within a space between the wall of the borehole and the acoustic source using the transmitted acoustic waves. Further, the method 70 calls for (step 73) receiving an acoustic signal with an acoustic receiver disposed at the wall of the borehole. Because the acoustic receiver is in the borehole at the interface with the borehole wall, the received acoustic signal relates to the radial acoustic eigenwaves generated in the borehole. Further, the method calls for (step 74) sensing an electric field signal with an electric field sensor disposed at the wall of the borehole. Further, the method 70 calls for (step 75) estimating the property using the acoustic signal and the electric field signal. The method 70 can also include changing the viscosity of the borehole fluid in order to shift an acoustic sensitivity area.

In support of the teachings herein, various analysis components may be used, including a digital and/or an analog system. For example, the downhole electronics 5, the surface computer processing 6, or the electronic monitoring device 9 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a property of an earth formation penetrated by a borehole, the method comprising:
   transmitting radial acoustic waves at a resonant eigenfrequency into the formation from an acoustic source disposed in the borehole and away from a wall of the borehole;
   generating radial acoustic eigenwaves at the resonant eigenfrequency within a space between the wall of the borehole and the acoustic source using the transmitted acoustic waves;
   receiving an acoustic signal with an acoustic receiver disposed at the wall of the borehole;
   sensing an electric field signal with an electric field sensor disposed at the wall of the borehole; and
   estimating the property using the received acoustic signal and the sensed electric field signal.

2. The method according to claim 1, wherein the property is permeability.

3. The method according to claim 2, further comprising determining a friction coefficient from the received acoustic signal, the friction coefficient relating motion of a fluid in a formation matrix to motion of the matrix.

4. The method according to claim 3, further comprising determining an electroacoustic constant from the sensed electric field signal, the electroacoustic constant relating a value of a generated electric field to fluid flow through a porous medium.

5. The method according to claim 4, wherein determining an electro acoustic constant comprises solving the following equation:

$$E_r = \frac{\alpha \rho_s}{\sigma}(u_r - v_r)$$

where $E_r$ is a radial component of the sensed electric field;
$\alpha$ is the electroacoustic constant;
ρs is a partial density of the formation matrix;
$u_r$ is a radial velocity of the formation matrix;
$v_r$ is a radial velocity of the fluid in the formation matrix; and
$\sigma = -\alpha^2 / (\chi^* - \chi)$, where $\chi^*$ is the friction coefficient when $\alpha \neq 0$ and x is the friction coefficient when $\alpha = 0$.

6. The method according to claim 4, wherein the friction coefficient and the electro acoustic constant are used to determine the permeability.

7. The method according to claim 1, wherein estimating the property comprises estimating permeability and satisfying the following boundary condition:

$$(1-\Phi)u_r^{(1)} + \Phi v_r^{(1)} = v_r^{(0)}$$

where $\Phi$ is porosity, $u_r^{(1)}$ is the radial velocity of a formation matrix, $v_r^{(1)}$ is the radial velocity of a fluid in the formation, and $v_r^{(1)}$ is the radial velocity of a fluid in the borehole.

8. An apparatus for estimating a property of an earth formation penetrated by a borehole, the apparatus comprising:
a carrier configured to be conveyed through the borehole;
an acoustic source disposed at the carrier and away from a wall of the borehole, the acoustic source configured to transmit radial acoustic waves at a resonant eigenfrequency into the formation to generate radial acoustic eigenwaves at the resonant eigenfrequency within a space between the wall of the borehole and the acoustic source;
an acoustic receiver disposed at the carrier and configured to be located at the wall of the borehole and to receive an acoustic signal;
an electric field sensor disposed at the carrier and configured to be located at the wall of the borehole and to sense an electric field signal; and
a processor coupled to the acoustic receiver and the electric field sensor and configured to estimate the property using a received acoustic signal and a sensed electric field signal.

9. The apparatus according to claim 8, wherein the property is permeability.

10. The apparatus according to claim 8, wherein the carrier comprises a wireline or a drill string.

11. The apparatus according to claim 8, wherein the processor is disposed at a surface of the earth.

12. The apparatus according to claim 8, wherein the processor is disposed downhole.

13. A non-transitory computer readable medium comprising computer executable instructions for estimating a property of an earth formation penetrated by a borehole by implementing a method comprising:
receiving an acoustic signal with an acoustic receiver disposed in the borehole at a wall of the borehole, the acoustic signal being related to radial acoustic eigenwaves at a resonant eigenfrequency generated within a space between the wall of the borehole and an acoustic source transmitting radial acoustic waves at the resonant eigenfrequency into the earth formation;
sensing an electric field signal with an electric field sensor disposed in the borehole at the wall of the borehole; and
estimating the property using the received acoustic signal and the sensed electric field signal.

14. The computer readable medium according to claim 13, wherein the property is permeability.

* * * * *